(12) United States Patent
Broder et al.

(10) Patent No.: US 6,418,013 B1
(45) Date of Patent: Jul. 9, 2002

(54) SYSTEM AND METHOD FOR ONE TOUCH OPERATION OF A DOCKING STATION

(75) Inventors: Damon W. Broder; Jefferson Blake West, both of Austin, TX (US)

(73) Assignee: Dell Products Inc., Round Rock, TX (US)

(*) Notice: Subject to any disclaimer, the term of this patent is extended or adjusted under 35 U.S.C. 154(b) by 0 days.

(21) Appl. No.: 09/457,202

(22) Filed: Dec. 6, 1999

(51) Int. Cl.[7] .................................................. G06F 1/16
(52) U.S. Cl. ....................................... 361/686; 361/724
(58) Field of Search ................................ 361/679–686, 361/724, 725, 726, 727

(56) References Cited

U.S. PATENT DOCUMENTS

| | | | |
|---|---|---|---|
| 5,440,448 A | | 8/1995 | Stewart et al. ............... 361/684 |
| 5,450,271 A | * | 9/1995 | Fukushima et al. .......... 361/686 |
| 5,506,990 A | | 4/1996 | Holman, Jr. .................. 395/750 |
| 5,622,064 A | | 4/1997 | Gluskoter et al. ............. 70/14 |
| 5,687,592 A | | 11/1997 | Penniman et al. ............. 70/14 |
| 5,790,375 A | * | 8/1998 | Lee .............................. 361/686 |
| 5,812,356 A | | 9/1998 | O'Connor ..................... 361/179 |
| 5,812,370 A | | 9/1998 | Moore et al. ................. 361/684 |
| 5,818,691 A | | 10/1998 | McMahan et al. ........... 361/686 |
| 5,825,616 A | | 10/1998 | Howell et al. ............... 361/684 |
| 5,841,631 A | * | 11/1998 | Shin et al. .................... 361/686 |
| 5,852,546 A | | 12/1998 | Radloff et al. ............... 361/685 |
| 5,933,321 A | | 8/1999 | Roch et al. ................... 361/686 |
| 5,933,322 A | | 8/1999 | Roch et al. ................... 361/686 |
| 5,995,366 A | * | 11/1999 | Howell et al. ............... 361/686 |

FOREIGN PATENT DOCUMENTS

JP          10198459 A     7/1998     ............ G06F/1/16

OTHER PUBLICATIONS

U.S. Pending patent application Ser. No. 09/008,139 entitled "Docking Key Device and Method for Notebook Computers" by Bryan Howell, et al.; Dell USA, L.P., Filed Jan. 27, 1998.

(List continued on next page.)

*Primary Examiner*—Darren Schuberg
*Assistant Examiner*—Yean-Hsi Chang
(74) *Attorney, Agent, or Firm*—Baker Botts L.L.P.

(57) ABSTRACT

A system and method for one touch operation of a docking station for a portable computer are disclosed that provide significant advantages over prior developed techniques. The disclosed embodiments provide an easily implemented and relatively inexpensive technique for adding security to a portable computer docking station. A system incorporating teachings of the present disclosure may include a docking station that has a latching mechanism and an ejection tab. The latching mechanism may be operable to releasably secure a portable computer to the docking station by moving from an unlocked orientation into a locked orientation. The ejection tab may be operable to eject the portable computer from the docking station by moving into an eject orientation. The system may also include a lever that has an unlocked position, a locked position, and an eject position. The lever may be operable to move the latching mechanism from the unlocked orientation into the locked orientation by moving from the unlocked position to the locked position. The lever may be further operable to move the ejection tab to an eject orientation by moving into an eject position.

22 Claims, 4 Drawing Sheets

OTHER PUBLICATIONS

U.S. Pending patent application Ser. No. 09/007,958 entitled "A Computer Anti–Theft System and Method" by Bryan Howell, et al.; Dell USA, L.P., Filed Jan. 16, 1998.

U.S. Pending patent application Ser. No. 09/060,793 entitled "Computer Monitor Stand and Docking method" by Bryan Howell, et al.; Dell USA, L..P., Filed Apr. 15, 1998.

U.S. Pending patent application Ser. No. 09/014,191 entitled "Portable Computer Ejection Mechanism for Docking Devices" by Bryan Howell, et al.; Dell USA, L.P., Filed Jan. 27, 1998.

U.S. Pending patent application Ser. No. 09/014,183 entitled "Modular Docking Tray and Method" by Bryan Howell, et al.; Dell USA, L.P., Filed Jan. 27, 1998.

* cited by examiner

SYSTEM AND METHOD FOR ONE TOUCH OPERATION OF A DOCKING STATION

TECHNICAL FIELD

The present invention relates in general to the field of computing devices and, more particularly, to a system and method for one touch operation of a computer docking station.

BACKGROUND

Many modern computer users prefer portable computers to desk top computers. Examples of portable computers include laptop computers, notebook computers and sub-notebook computers. In terms of computing power, portable computers are often equivalent to desk tops computers. In fact, many portable computers have central processing units (CPU's), memory capacities, and disk drives that are similar, if not equivalent, to their larger desk top counterparts. Unfortunately, portable computers also tend to have undersized peripherals such as keyboards and monitors. While these undersized features facilitate portability, many users feel the undersized features hinder the usability of portable computers.

As such, devices commonly referred to as docking stations have been developed. A typical docking station has a platform into which a user may install a portable computer. The docking station may, in some cases, have slots for expansion cards, bays for storage devices, and connectors for peripheral devices, such as printers, full size monitors, and full size keyboards. Once inserted in a docking station, a portable computer may operate like a desk top computer. When removed from a docking station, the portable computer may regain its portability advantage.

The general idea behind docking stations is to allow a user to enjoy the expansion possibilities and full size peripherals of desk top computers while maintaining the option of portability provided by a portable computer.

Unfortunately, because a portable computer does provide enhanced portability, placing the portable computer in a docking station creates several security issues. A portable computer may typically be within the possession of its user. However, when a portable computer is left in a docking station, for example, in an office setting, the portable computer may become an easy target for theft.

As such, many users desire the incorporation of security measures into their respective docking stations. Unfortunately, conventional techniques for adding security are often overly complex and burdensome. Often, conventional techniques for adding security to a docking station force a user to interact with the security system to separately lock and unlock the portable computer and each of the various peripheral devices which the security system protects. The various locking apparatus can be both confusing for the user and expensive to implement.

SUMMARY

In accordance with the present disclosure, a system and method for one touch operation of a portable computer docking station are disclosed that provide significant advantages over prior developed techniques. The disclosed embodiments provide an easily implemented and relatively inexpensive technique for adding security to a docking station.

According to one aspect of the present disclosure, a system incorporating teachings of the present disclosure may include a docking station that has a latching mechanism and an ejection tab. The latching mechanism may be operable to secure a portable computer to the docking station by moving from an unlocked orientation to a locked orientation. The ejection tab may be operable to eject the portable computer from the docking station by moving into an eject orientation. The system may also include a lever that has an unlocked position, a locked position, and an eject position. The lever may be operable to move the latching mechanism from the unlocked orientation into the locked orientation by moving from the unlocked position to the locked position. The lever may be further operable to move the ejection tab into an eject orientation by moving into the eject position.

According to another aspect of the present disclosure, a method for providing one touch operation of a docking station may include loading a portable computer into a docking station having at least one latching mechanism, an ejection tab, and a lever operable to actuate the latching mechanism and the ejection tab. An exemplary method may also include securing the portable computer to the docking station with the at least one latching mechanism by moving the lever from an unlocked position to a locked position. The at least one latching mechanism may include several different locks and hooks. For example, the latching mechanisms may include a front hook, a rear hook, a lid lock, and a media bay lock.

If a user desires to remove a portable computer from a docking station, the user may release the portable computer from the docking station by moving the lever to the unlocked position. This one movement may cause the hooks and locks associated with the docking station to let go of the portable computer. Once released, the user may eject the portable computer from the docking station by moving the lever to an eject position.

The disclosed system and method provide several technical advantages over conventional approaches for securing a portable computer located in a docking station. For example, allowing a user to actuate all available locking features with a single lever provides the user with a simple and easy to learn security system. Moreover, a system incorporating teachings of the present disclosure may be relatively inexpensive to manufacture and operate. The system may require only one lever for actuation, which reduces manufacturing cost. In addition, by using only one lever, a user may add additional security like that provided by devices such as pad locks or axial pin tubular locks, to all available locking features by adding the additional device to the single lever.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
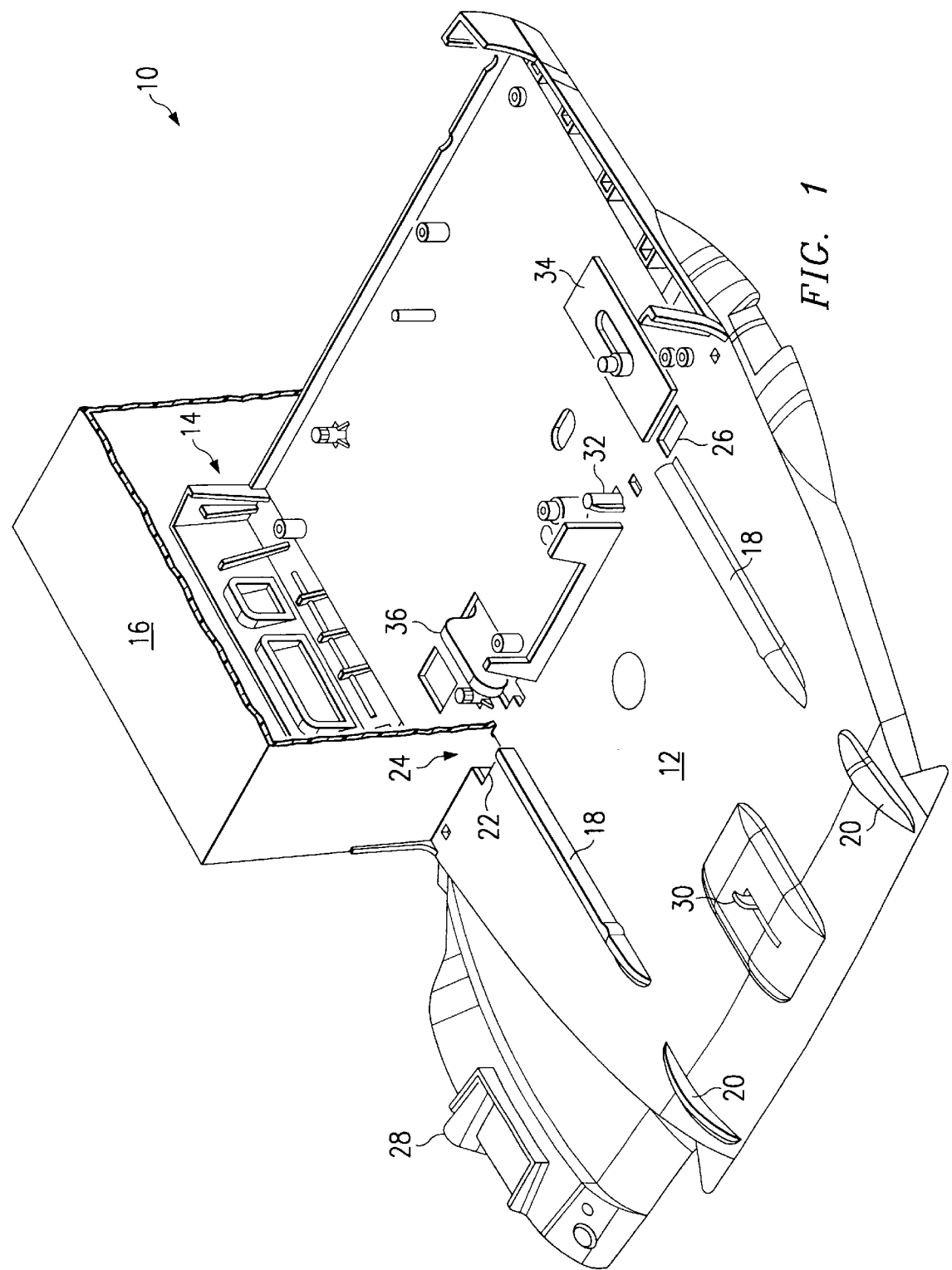
FIG. 1 shows an isometric view of a docking station for a portable computer incorporating teachings of the present disclosure.

FIG. 1 shows an isometric view of a docking station 10 incorporating teachings of the present disclosure. As depicted, docking station 10 may be formed from extruded plastic. In other embodiments, docking station 10 may be formed from different materials. For example, docking station 10 may be formed from metallic materials or composite materials. Docking station 10 may include a receiving platform 12 and an enclosure 14, which may be at least partially formed by a lid 16. Platform 12 may be formed with guide rails 18 and 20 to assist in aligning a portable computer with docking station 10. Guide rails 18 and 20 may also limit movement of an installed portable computer by interacting with a bottom section of the installed computer's housing.

Enclosure 14 may house various components of docking station 10. For example, installed peripheral component interface (PCI) cards may be located within enclosure 14. As such, a user of docking station 10 may desire a security system that protects items located within enclosure 14. One technique for securing enclosure 14 in accordance with teachings of the present disclosure may involve a lid lock, representatively depicted at 22. As depicted in FIG. 1, lid 16 may have a tab 24 that extends into a tab opening, for example tab opening 26. Lid lock 22 may engage tab 24 when lid lock 22 is locked and, as a result, secure lid 16 in a closed position.

A user seeking to actuate lid lock 22 may use lever 28, which is depicted in a locked position in FIG. 1. In some embodiments, lever 28 may have at least three positions including locked, unlocked, and eject. In operation, a user may place a portable computer on platform 12 while lever 28 is in an unlocked position. A user may then move lever 28 from the unlocked position to the locked position, effectively securing the portable computer to docking station 10. In preferred embodiments, docking station 10 may have several locking mechanisms. These mechanisms may include, for example, a front hook 30, a rear hook 32, and a media bay lock 34.

Front hook 30 and rear hook 32 may lock a portable computer in place by engaging a front portion and a rear portion, respectively, of the portable computer's housing. Similarly, media bay lock 34 may, when actuated, block access to the docking station's media bay and, in some embodiments, the portable computer's battery compartment. As depicted in FIG. 1, front hook 30 is in a locked orientation. Moving lever 28 to an unlocked position may cause front hook 30 to move from the depicted locked orientation to an unlocked orientation. Similarly, moving lever 28 to an unlocked position may cause rear hook 32 and media bay lock 34 to move from their respective locked orientations to unlocked orientations.

In addition to the various locking mechanisms depicted in FIG. 1, docking station 10 may include an ejection tab 36. In some embodiments, moving lever 28 to an eject position will cause ejection tab 36 to press against a portion of an installed computer and eject the installed computer from docking station 10. In preferred embodiments, ejection tab 36 may be spring loaded and able to return to a non-ejecting orientation when lever 28 is no longer held in its eject position. The various positions of a docking station lever incorporating teachings of the present disclosure may be better understood by reference to FIG. 2.

Figure 2:
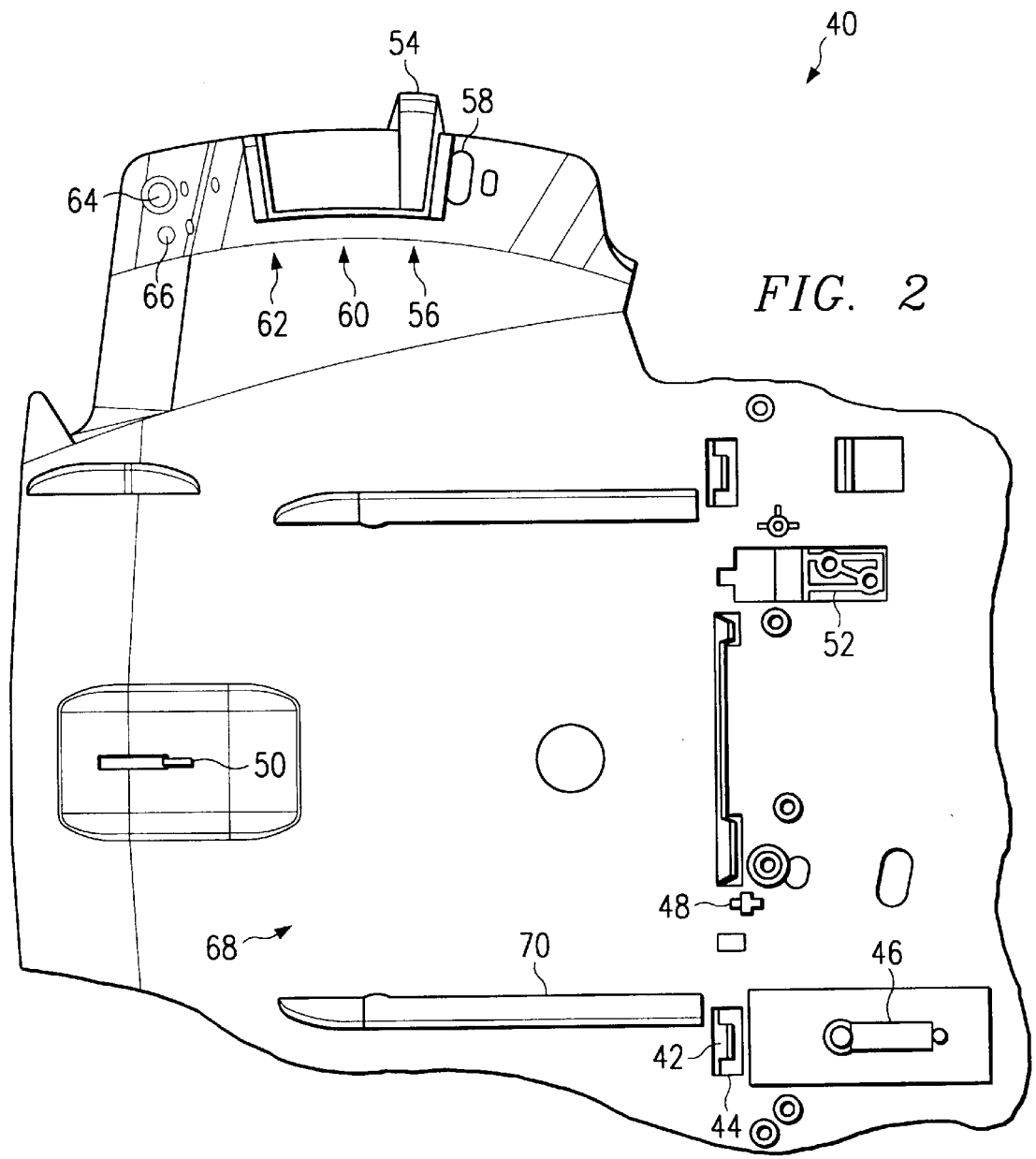
FIG. 2 shows a partial top view of a docking station incorporating teachings of the present disclosure.

FIG. 2 shows a partial top view of a docking station 40 incorporating teachings of the present disclosure. As depicted, docking station 40 may include a lid lock 42, a tab opening 44, a media bay lock 46, a rear hook 48, and a front hook 50. In addition, FIG. 2 shows docking station 40 to have an ejection tab mounting area 52.

FIG. 2 also shows a lever 54 for actuating lid lock 42, media bay lock 46, rear hook 48, and front hook 50. As depicted, lever 54 is in a locked position 56. In some embodiments, docking station 40 may provide a locking hole 58 sized and located to allow a lock to block movement of lever 54 from locked position 56 to an unlocked position 60. The lock may in some embodiments be a pad lock though other locks may also be used. For example, a user may choose an axial pin tubular lock such as a KENSINGTON lock, manufactured by Kensington Microwave Limited of San Mateo, Calif. Lever 54 may have a third position, an eject position 62, for ejecting an installed computer from docking station 40. Other features of docking station 40 may include a power on button 64, a light emitting diode (LED) 66 for indicating when docking station 40 is powered on, and a receiving platform 68 with guide rails 70.

Figure 3:
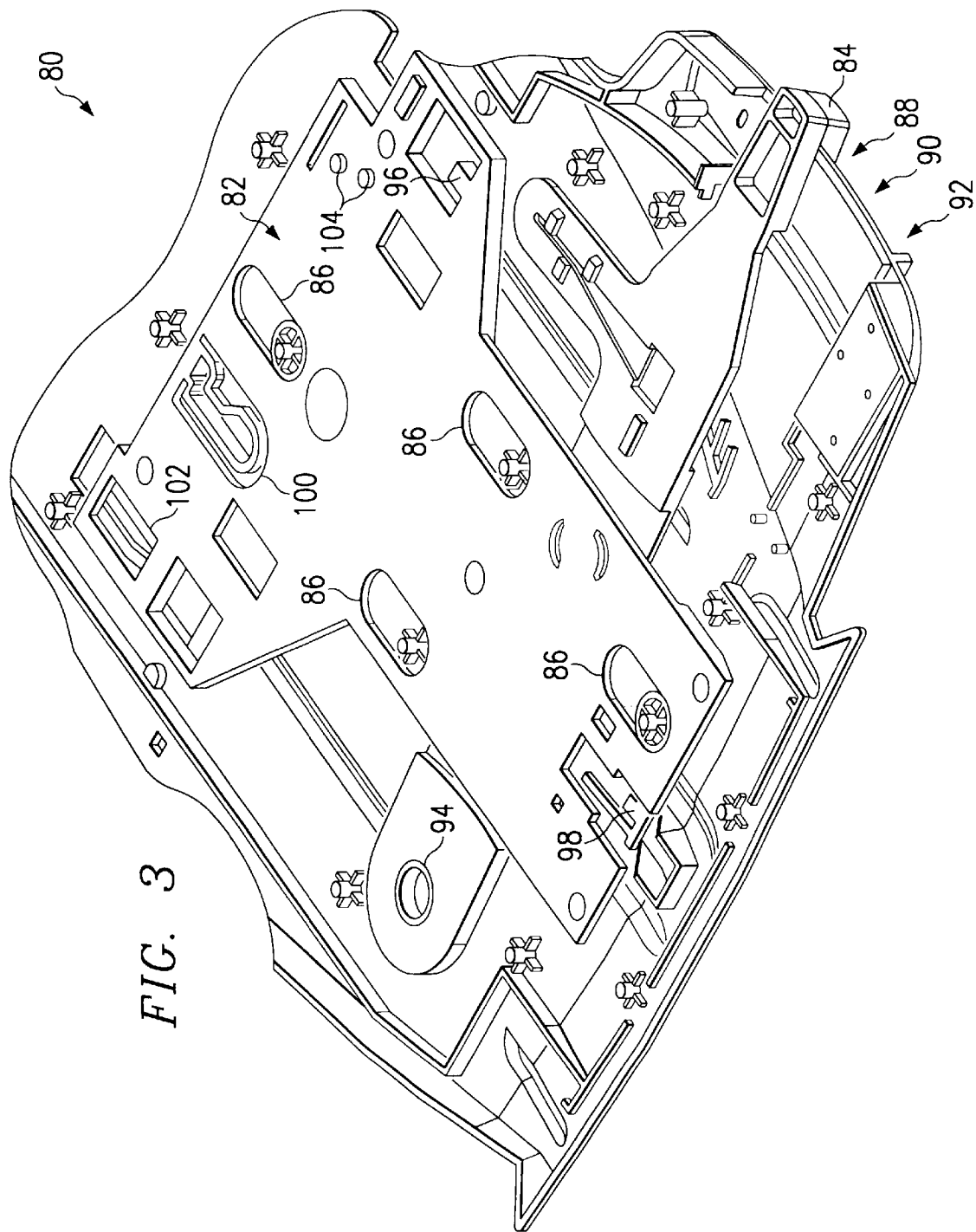
FIG. 3 shows a partial bottom view of a docking station incorporating teachings of the present disclosure.

FIG. 3 shows a partial bottom view of a docking station 80 incorporating teachings of the present disclosure. The embodiment depicted in FIG. 3 has a primary base plate 82 coupled to a lever 84. Primary base plate 82 and lever 84 may be formed from any number of materials including, for example, metal, plastic, or composites. As depicted, primary base plate 82 has several guide slots 86, which may limit movement of primary base plate 82 to a back and forth linear movement. As depicted in FIG. 3, lever 84 and primary base plate 82 are in a locked position 88.

In some embodiments, lever 84 may have three positions including locked position 88, an unlocked position 90, and an eject position 92. In operation, lever 84 may be moved between these three position by rotating around pivot point 94. Moving lever 84 in this fashion may cause primary base plate 82 to move in the direction allowed it by guide slots 86. As such, primary base plate 82 may also have three positions including a locked position, an unlocked position, and an eject position.

In preferred embodiments, moving lever 84 and, resultantly, base plate 82 may cause the actuation of all locking mechanisms associated with docking station 80. For example, lid lock 96 may engage a lid tab, for example tab 24 of FIG. 1, when primary base plate 82 moves into a locked position. Similarly, moving primary base plate 82 into a locked position may cause front hook actuation cam 98 to move a front hook, for example front hook 30 of FIG. 1, into a locked orientation, cause rear hook actuation cam 100 to move a rear hook, for example rear hook 32 of FIG. 1, into a locked orientation, and cause media bay actuation cam 102 to move a media bay lock, for example media bay lock 34 of FIG. 1, into a locked orientation.

In addition, primary base plate 82 may provide a mount 104 to facilitate mounting of an ejection tab, for example ejection tab 36 of FIG. 1. In operation, moving lever 84 and, resultantly, moving primary base plate 82 into an eject position may cause an ejection tab secured to mount 104 to eject an installed computer from docking station 80. In some embodiments, lever 84 may be spring loaded to move from eject position 92 to unlocked position 90 when it is no longer held in eject position. In other embodiments, docking station 80 may provide one detent at locked position 88 and another detent at unlocked position 90 to help hold lever 84 in these positions when lever 84 is no longer manually held in these positions by a user.

Figure 4:
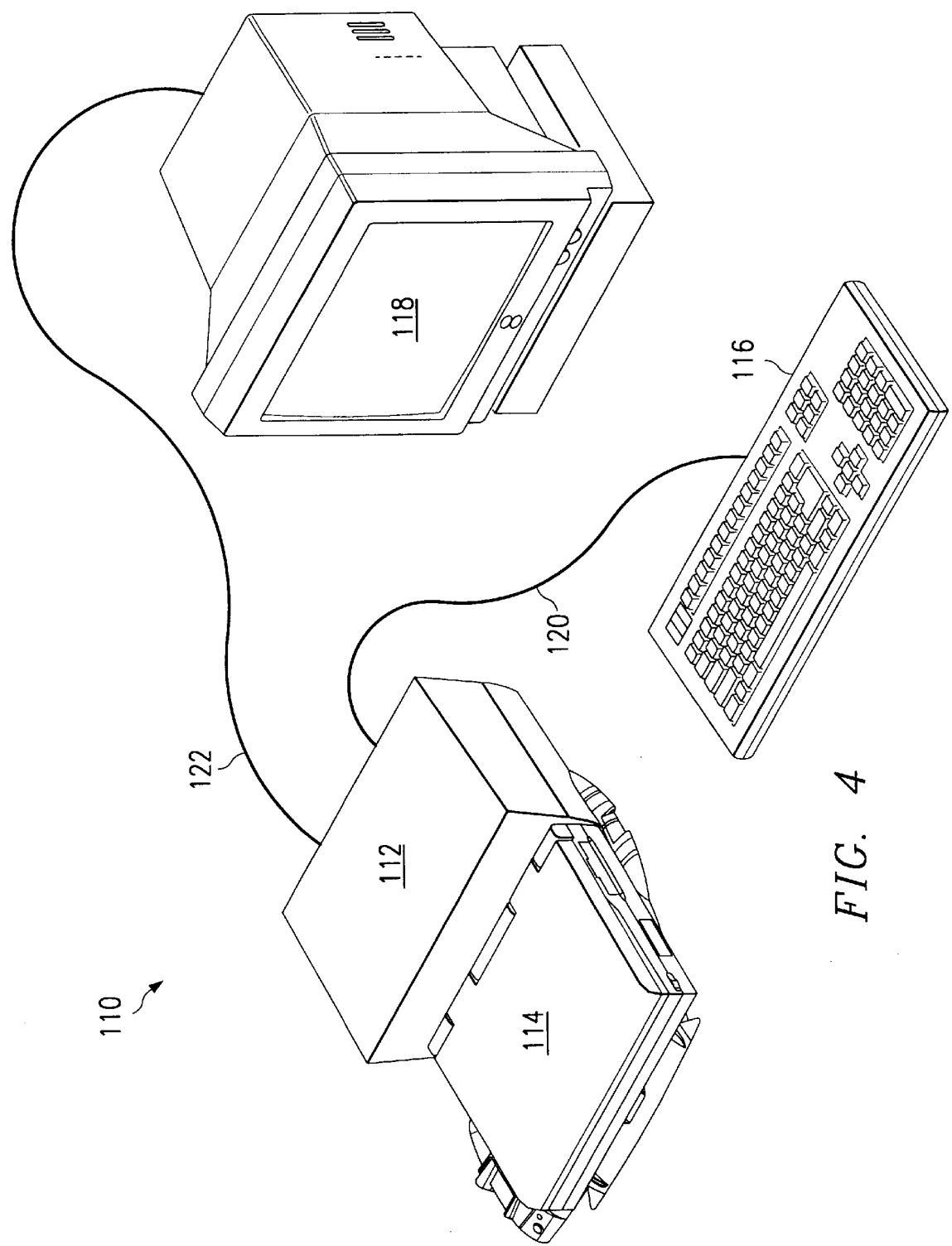
FIG. 4 depicts a computer system including a docking station incorporating teachings of the present disclosure, a portable computer, a full size keyboard and a full size monitor.

FIG. 4 depicts a computer system 110 including a docking station 112 that incorporates teachings of the present disclosure, a portable computer 114, a full size keyboard 116, and a full size monitor 118. As depicted, keyboard 116 is communicatively coupled to docking station 112 via communication cable 120, and monitor 118 is communicatively coupled to docking station 112 via communication cable 122. Computer system 110 makes more clear how docking station 112 may allow a user to use portable computer 114 like a desk top when portable computer 114 is installed in docking station 112.

Although the present invention has been described in detail, it should be understood that various changes, substitutions and alterations can be made thereto without departing from the spirit and scope of the invention as defined by the appended claims.

What is claimed is:

1. A computer system, comprising:

a portable computer having a housing, the housing formed in part to couple with a guide rail located on a receiving platform of a docking station;

the docking station including the guide rail, the receiving platform, a base plate, a latching mechanism and an ejection tab;

the latching mechanism comprises a single front hook operable to secure a front portion of the portable computer housing to the docking station by moving from an unlocked orientation to a locked orientation;

the ejection tab operable to eject the portable computer from the docking station by moving to an eject orientation;

the base plate operable by a lever to move along the direction of a guide slot, the base plate including a locked position, an unlocked position and an eject position;

the lever having an unlocked position, a locked position, and an eject position, the lever operable to move the base plate in a direction parallel to the guide rail causing actuation of the latching mechanism from the unlocked orientation into the locked orientation by moving from the unlocked position to the locked position; and the lever further operable to move the base plate causing actuation of the ejection tab to the eject orientation by moving from the unlocked position to the eject position.

2. The computer system of claim 1, wherein the docking station further comprises a rear hook operable to couple with a rear portion of the portable computer housing, a media bay lock operable to block access to a media bay, further wherein the lever is operable to lock the rear hook and the media bay by moving from the unlocked position to the position to the locked position.

3. The computer system of claim 2, further comprising a locking hole formed through a portion of the docking station adjacent the lever, the locking hole sized and located to allow a lock to block movement of the lever from the locked position.

4. The computer system of claim 3, wherein the lock comprises a pad lock.

5. The computer system of claim 3, further comprising:

a monitor operable to communicatively couple with the docking station; and a keyboard operable to communicatively couple with the docking station.

6. A system for one touch slide operation of a docking station, comprising:

a docking station operable by a one touch slide operation including a pair of guide rails, at least one latching mechanism and an ejection tab;

at least one latching mechanism disposed between the pair of guide rails operable to secure a portable computer to the docking station by moving from an unlocked orientation to a locked orientation;

the ejection tab having an eject orientation and a non-eject orientation, the ejection tab operable to eject the portable computer from the docking station by moving into the eject orientation; and a lever having an unlocked position, a locked position, and an eject position, the lever operable to actuate the latching mechanism for movement from the unlocked orientation to the locked orientation by sliding from the unlocked position to the locked position and further operable for actuating the ejection tab into the eject orientation by sliding to the eject position.

7. The system of claim 6, further comprising:

a lock detent operable to maintain the lever in the locked position; and an unlock detent operable to maintain the lever in the unlocked position.

8. The system of claim 6, further comprising a locking hole formed through a portion of the docking station adjacent the lever, the locking hole sized and located to allow a lock to block movement of the lever from the locked position.

9. The system of claim 6, further comprising a locking hole formed through a portion of the docking station adjacent the lever, the locking hole sized and located to allow an axial pin tubular lock to block movement of the lever from the locked position.

10. The system of claim 6 wherein the latching mechanism comprises a single front hook operable to couple with a front portion of a portable computer housing.

11. The system of claim 10 further comprising:

a docking station enclosure at least partially formed by a lid; and a lid lock associated with the docking station and operable to secure the lid in a closed position.

12. The system of claim 11 further comprising:

a rear hook associated with the docking station and operable to couple with a rear portion of a portable computer housing; and a media bay lock associated with the docking station and operable to block access to a media bay.

13. The system of claim 12, wherein the lever is operable to lock the lid lock, the rear hook, and the media bay lock by moving from the unlocked position to the locked position.

14. A method for one touch slide operation of a docking station, comprising:

loading a portable computer into a docking station operable by a one touch slide operation having a pair of guide rails, at least one latching mechanism, an ejection tab, and a lever operable to actuate a base plate along a direction determined by a guide slot for actuating the latching mechanism and the ejection tab;

securing the portable computer to the docking station with the at least one latching mechanism disposed between the pair of guide rails by sliding the lever from an unlocked position to a locked position;

releasing the portable computer from the docking station by sliding the lever to the unlocked position; and ejecting the portable computer from the docking station by sliding the lever to an eject position.

15. The method of claim 14, wherein the latching mechanism comprises a single front hook operable to couple with a front portion of a portable computer housing.

16. The method of claim 14, further comprising securing a lid at least partially forming a docking station enclosure in a closed position with a lid lock by moving the lever from the unlocked position to the locked position.

17. The method of claim 14 further comprising locking the lever in the locked position with a pad lock.

18. The method of claim 14, further comprising:

coupling a rear hook associated with the docking station with a rear portion of a portable computer housing by moving the lever from the unlocked position to the locked position; and locking a media bay lock associated with the docking station and operable to block access to a media bay by moving the lever from the unlocked position to the locked position.

19. The method of claim 18, further comprising:

uncoupling the rear hook from the rear portion of the portable computer housing by moving the lever from the locked position to the unlocked position; and unlocking the media bay lock by moving the lever from the locked position to the unlocked position.

20. A computer system, comprising:

a portable computer having a housing formed to couple with a docking station by engaging a pair of guide rails projecting from a platform forming a part of the docking station;

the docking station including an ejection tab and latching mechanisms comprising a single front hook and a rear hook;

the latching mechanism interposed between the pair of guide rails and operable to releasably secure the portable computer to the docking station by moving from respective unlocked orientations to respective locked orientations;

the ejection tab having an eject orientation and a non-eject orientation, the ejection tab operable to eject the portable computer from the docking station by moving into the eject orientation;

a lever having an unlocked position, a locked position, and an eject position, the lever operable to rotate around a pivot point causing the movement of a base plate; and the base plate having a guide slot for controlling a direction of movement, the base plate operable to move the latching mechanism from the respective unlocked orientations to the respective locked orientations by sliding from the unlocked position to the locked position and further operable to move the ejection tab into the eject orientation by sliding to the eject position.

21. The computer system of claim 20, wherein the portable computer comprises a laptop computer.

22. The computer system of claim 21, wherein the portable computer comprises a notebook computer.

* * * * *